Sept. 9, 1958

L. ZIMMERMAN 2,851,564

RELIEF VALVE

Filed May 9, 1955

INVENTOR:
LOUIS ZIMMERMAN

Sept. 9, 1958 L. ZIMMERMAN 2,851,564
RELIEF VALVE
Filed May 9, 1955 3 Sheets-Sheet 2

INVENTOR:
LOUIS ZIMMERMAN

Sept. 9, 1958

L. ZIMMERMAN 2,851,564

RELIEF VALVE

Filed May 9, 1955

INVENTOR:
LOUIS ZIMMERMAN

United States Patent Office 2,851,564
Patented Sept. 9, 1958

2,851,564

RELIEF VALVE

Louis Zimmerman, Palos Heights, Ill., assignor to U. S. Industries, Inc., Chicago, Ill., a corporation of Delaware Application May 9, 1955, Serial No. 506,892

2 Claims. (Cl. 200—83)

This invention relates in general to relief valves and is particularly directed to a novel form of relief valve adapted for use in a hydraulic circuit.

Relief valves have been used heretofore in hydraulic circuits for the purpose of relieving the pressure exerted by the hydraulic fluid when such pressure exceeds a predetermined amount. For the most part, however, the predetermined pressure beyond which the valve will operate has been established by mechanical means. Certain applications of the relief valve make it disadvantageous and inconvenient to adjust the mechanical pressure regulating means, for example, when the valve is applied to the hydraulic circuit of a hydraulic metal drawing press. The valve in such instances is customarily placed in the circuit at or near the top of the press making it necessary for the machine operator to climb up to the valve for the purpose of adjusting the pressure at which it will operate.

While the relief valve embodying the present invention is particularly desirable for use in connection with hydraulic metal drawing presses, it will be understood that the advantages of the invention will be equally useful in other applications wherever a relief valve is necessary in a hydraulic circuit.

The principal object of the present invention is to provide a relief valve for use in hydraulic circuits wherein the disadvantages mentioned hereinabove are overcome by enabling the pressure at which the valve operates to be regulated at a point remote from the valve itself.

Another object of the invention is to provide a relief valve for use in hydraulic circuits wherein the fluid pressure operates in opposition to air pressure so that when the air pressure is exceeded by the fluid pressure, the valve will operate to relieve such excessive pressure.

A further object of the invention is to provide a relief valve for use in hydraulic circuits consisting of a main valve normally maintained closed by the hydraulic fluid and an auxiliary valve normally maintained closed by air pressure, wherein the fluid pressure will be exerted in opposition to the air pressure so that when such predetermined air pressure is exceeded, the auxiliary valve will open to relieve the excessive fluid pressure.

Still another and more specific object of the invention is to provide a relief valve for use in hydraulic circuits wherein a main valve is normally maintained closed by hydraulic pressure and an auxiliary valve is normally maintained closed by air pressure, and wherein movement of the auxiliary valve under the influence of hydraulic pressure will actuate a switch to perform some additional operation, such as the operating of a valve or other switch means.

Other objects and advantages of the invention will become apparent upon reading the following description taken in conjunction with the accompanying drawings, in which.

Figure 1:
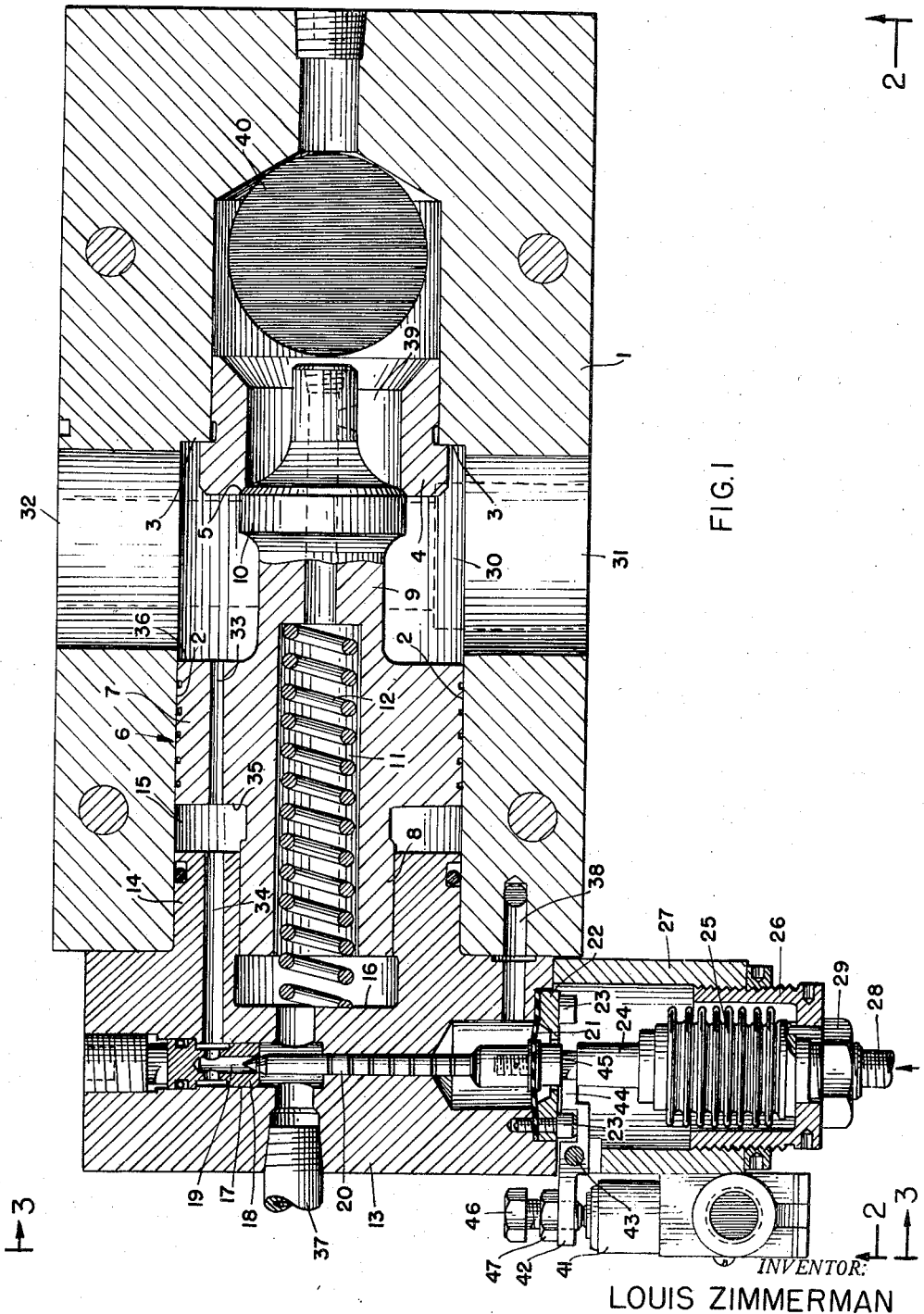
Fig. 1 is a vertical longitudinal sectional view through the relief valve embodying the present invention and illustrating the main and auxiliary valves in closed position.
Figure 2:
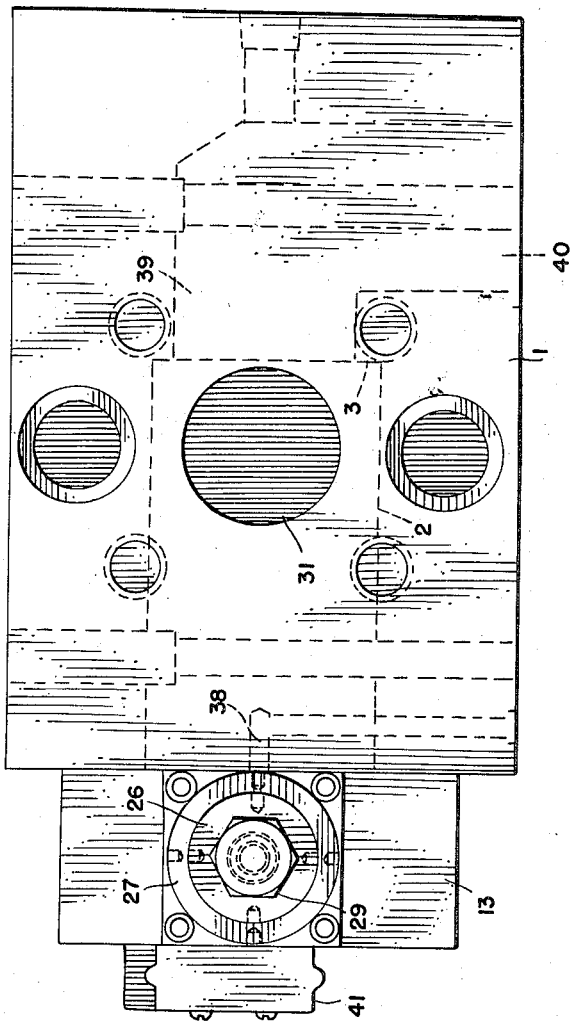
Fig. 2 is an under-plan view on a somewhat reduced scale of the structure shown in Fig. 1 and taken along the plane of line 2—2 of Fig. 1.
Figure 3:
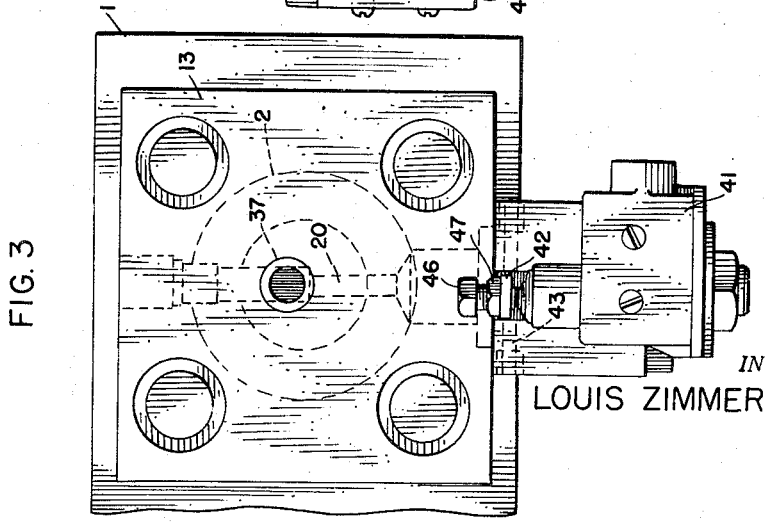
Fig. 3 is an end elevational view taken along the plane of line 3—3 of Fig. 1.

The invention may be briefly described as comprising an outer casing having a main valve therein adapted to move longitudinally between open and closed positions. A cap is located at one end of the casing within which an auxiliary valve is mounted. The auxiliary valve is maintained closed under normal conditions by air pressure while the main valve is maintained closed by the pressure of hydraulic fluid. Suitable passageways permit the hydraulic fluid to communicate with the auxiliary valve and to exert fluid pressure in opposition to the air pressure. The air pressure may be regulated and adjusted at any suitable point remote from the valve by any suitable and well known means and when the fluid pressure exceeds the air pressure, the auxiliary valve will be opened, thus relieving the excess pressure of the hydraulic fluid. The arrangement is such that the main valve will also open and permit the hydraulic fluid to flow back to the main tank from which it has been pumped.

Referring now more particularly to the drawings, the main outer casing of the device is indicated by the numeral 1 and this casing has a bore 2 therein extending inwardly for a distance from one end thereof. The inner end of the bore is formed of a lesser diameter, thereby providing an annular shoulder 3. An insert 4 is located within the part of the bore of lesser diameter and has a shoulder thereon bearing against the shoulder 3, thereby limiting its inward movement and maintaining it stationary. The insert 4 is in the shape of a ring and is provided with a valve seat 5.

A main valve generally indicated by the numeral 6 is positioned within the bore 2 for sliding movement therein. The main valve 6 is provided intermediate the ends thereof with an annular portion 7 of such diameter as to snugly fit within the bore 2 and yet may freely slide therein. The valve 6 then has an outer end portion 8 of smaller diameter than the annular portion 7. The valve 6 also is provided with an inner extension 9 extending in the opposite direction from the portion 8 and likewise of smaller diameter than the annular part 7 and is provided with a spool 10 adapted to seat against the valve seat 5 when in closed position.

The outer end of the main valve 6 has a bore 11 extending inwardly therefrom within which a coiled spring 12 is located as an aid in moving the main valve to its closed position.

A cap 13 is provided with an annular flange portion 14 having an outer diameter substantially equal to the diameter of the bore 2 in the casing so that it may snugly fit within the bore 2 and be secured by any suitable means to the casing. The length of the annular flange 14 is such that when the cap 13 is in place, the flange 14 will terminate in spaced relation to the annular portion 7 on the main valve 6, thereby providing an annular chamber 15 around the outer end 8 of the main valve. The coiled spring 12 will abut against the inner end of the bore 11 at one end thereof and against the face 16 of the cap 13 located at the base of the annular flange 14. It will thus be seen that the spring 12 will urge the main valve 6 toward its closed position.

The cap 13 is provided with an elongated bore 17 therein provided at one point with an annular insert 18 having a passageway 19 extending longitudinally thereof. A needle valve 20 is positioned within the bore 17 and has a tapered upper end extending into the passageway 19 and adapted to seat against the member 18 when in closed position.

The needle valve 20 extends downwardly and adjacent its lower end is suitably secured to a diaphragm 21 held in place by means of a retaining ring 22 secured in a recess in the cap 13 by means, such as the screws 23.

The lower end of the needle or auxiliary valve 20 is secured to the upper end 24 of a bellows 25. Thus, the auxiliary valve 20 is above the diaphragm 21 and the bellows 25 is positioned therebelow so that the diaphragm 21 is secured between the valve and the bellows.

The bellows 25 is disposed within an annular threaded member 26 which threadedly engages an internally threaded extension 27 below the cap 13. An inlet pipe 28 communicates with the bellows 25 and is held in place by means of a nut 29. Air pressure is carried by pipe 28 into the bellows 25 which expands the bellows moving the diaphragm 21 and auxiliary valve 20 upwardly so that the valve will normally remain in a closed position. The air pressure within the bellows 25 can be regulated from the source of the air under pressure or at any other suitable or desired place remote from the valve itself.

The inner end 9 of the main valve 6 being of lesser diameter than the enlarged annular portion 7 is thereby provided with an annular chamber 30 adapted to receive hydraulic fluid under pressure which is pumped thereto through the inlet 31 at one side thereof and which leaves the valve through the outlet 32 at the opposite side thereof.

The hydraulic fluid under pressure being pumped through the casing 1 and the annular chamber 30 will also be forced through the relatively small passageway 33 in the annular portion 7 of the main valve and will fill the annular chamber 15. The fluid will then pass through the passageway 34 in the cap 13 which is in communication with the annular chamber 15 at one end and the bore 17 within the cap. At this point it will be evident that the passages 19 and 34 as well as the chamber 15 will be filled with hydraulic fluid under pressure, which pressure will be exerted against the outer face 35 of the annular portion 7 on the main valve 6. This will occur because of the fact that the passageway 34 is larger than the passageway 33. This pressure against face 35 will be sufficient to maintain the main valve 6 in closed position.

Figure 4:
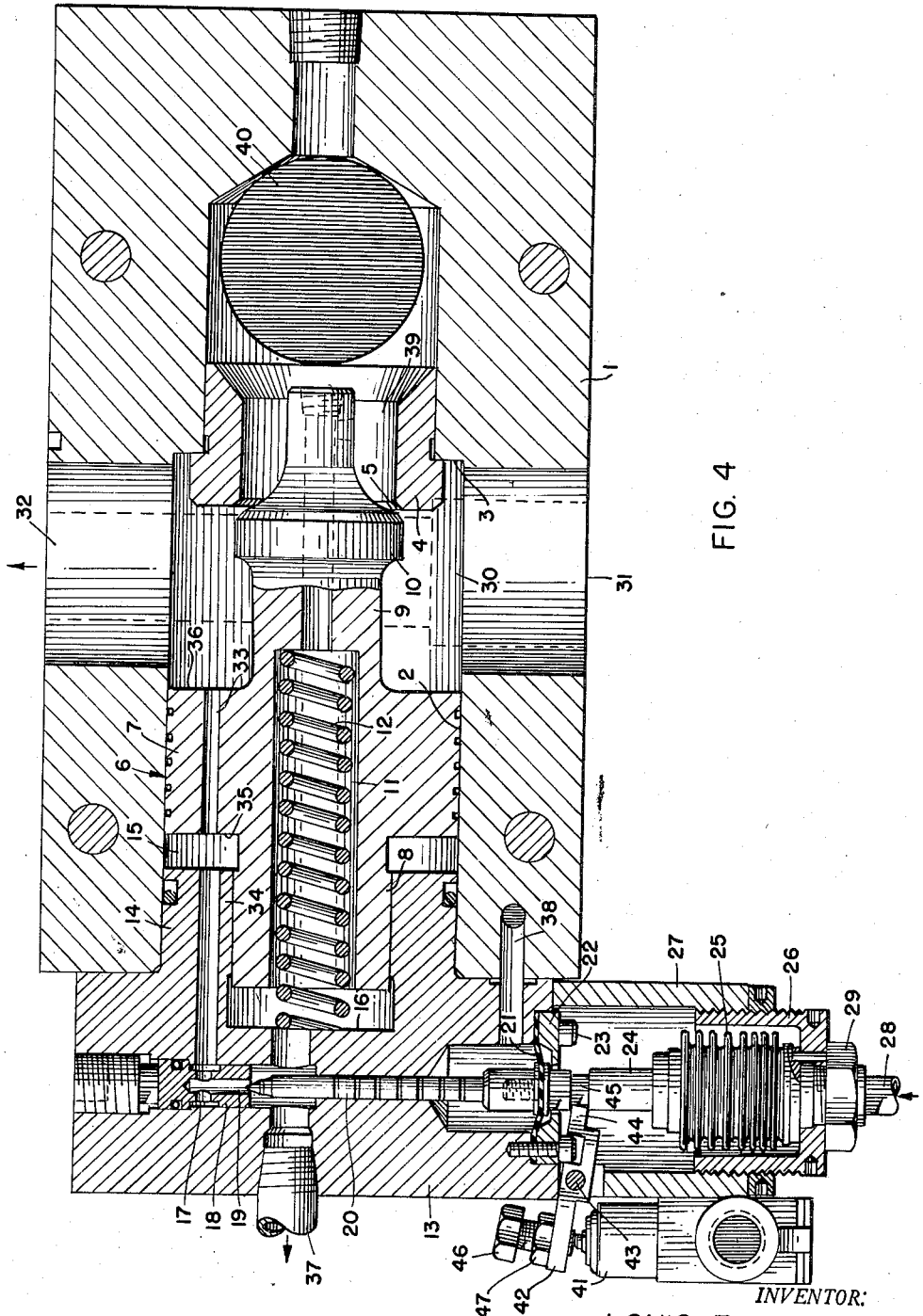
Fig. 4 is a view similar to Fig. 1 but showing the main and auxiliary valves in open position.

When the hydraulic fluid pressure builds up to the point where it exceeds the air pressure in the bellows 25 which has been set at a predetermined amount and which maintains the auxiliary valve 20 in closed position, the pressure being exerted in a direction opposite to that of the air pressure and against the upper end of valve 20, the valve will open by downawrd movement thereof to the limit of the diaphragm 21 as illustrated in Fig. 4. When this occurs the fluid in passageways 33 and 34 will no longer be under pressure since the fluid will be then free to flow through the passageway 19 in the insert 18 past the end of auxiliary valve 20. Since the passageway 33 is of smaller diameter than passageway 34, the hydraulic fluid flowing from chamber 15 through passageway 34 cannot be supplied through passageway 33 as fast as it is being depleted, whereupon the fluid in chamber 30 will build up pressure against the inner face 36 of the annular portion 7 on main valve 6, thereby moving the main valve toward the left to open position.

An outlet pipe 37 is connected with cap 13 and communicates with bore 17 therein so that the fluid moving past valve 20 will be returned to the tank through this pipe. If any of the hydraulic fluid should be permitted to flow past valve 20, it will be carried outwardly through the drain 38 provided in the assembled casing and cap.

When the main valve 6 is moved toward the left, as viewed in the drawings, to open position, the spool 10 will move away from the seat 5, whereupon some of the hydraulic fluid being pumped through the inlet 31 and into the annular chamber 30 will thereupon flow past the valve seat 5 into the chamber 39 which communicates with a passage 40 connected to the tank and such fluid will not be under pressure.

This condition as above described will prevail with both the main valve 6 and auxiliary valve 20 in open position until the occurrence of some subsequent event or operation, all of which will depend upon the machine to which the relief valve is applied. The occurrence of any subsequent operation must, however, be directly associated with the operation of the valve because as soon as the hydraulic pressure against auxiliary valve 20 is reduced below the predetermined air pressure, such valve will again be moved to closed position, whereupon the hydraulic fluid will immediately fill the annular chamber 15 to exert its pressure against face 35 of the annular portion 7 to move the main valve 6 to closed position.

In the present instance movement of the auxiliary valve 20 is designed to operate a switch 41 mounted on the cap 13 which switch may be connected to cause a subsequent operation to be performed. The switch 41 is caused to operate by means of an arm 42 pivotally mounted in the cap 13 by means of a pivot pin 43. The arm 42 extends inwardly and terminates so that its inner end 44 is received within an annular groove 45 in the upper end 24 of bellows 25. Thus, when the fluid pressure exceeds the air pressure to move the valve 20 and bellows 25 downwardly, the inner end 44 of arm 42 will be carried downwardly resulting in an upward movement of the outer end thereof. The outer end of arm 42 threadedly receives a bolt 46 held in place by a lock nut 47. Thus, upward movement of the outer end of arm 42 may either make or break a contact within the switch 41.

The switch 41 may be electrically connected either to a relay or a valve or any other type of device operable to cause some subsequent action to occur. This will depend, of course, upon the particular machine to which the valve embodying the present invention may be applied. For example, when the valve is applied to the hydraulic circuit of a hydraulic metal drawing press, the hydraulic fluid which causes the slide to move downwardly against the work is also pumped through the valve in the manner above described and will maintain the main valve in closed position. The air pressure will have been adjusted and set for a predetermined pressure so that when the hydraulic pressure reaches or exceeds this predetermined amount, the auxiliary valve 20 will be opened to actuate the switch 41. At the same time the main valve 6 will open and allow some of the fluid to be by-passed back to the tank. When the pressure of the slide reaches the predetermined maximum so that the hydraulic fluid operates the valve, the switch 41 may be caused to operate a valve which will reverse the flow of fluid or which will divert the fluid to the pull-back cylinders of the press to move the slide upwardly and return it to its position at the beginning of the working stroke. When the slide reaches its uppermost position, the auxiliary valve 20 and main valve 6 will return to their normal closed positions due to the drop in fluid pressure and the switch 41 will thereupon operate to return the operating valve to its previous position to divert the fluid flow to the cylinders which will again move the slide in a downward direction to perform a working stroke.

The foregoing application of the present valve to a hydraulic metal working press is given merely by way of example inasmuch as it will be clearly understood that a valve such as disclosed herein and embodying the present invention will have many other applications.

The present invention is certain in its operation and has the advantage of being able to adjust or regulate the pressure at which the valves may be operated at a point remote from the location of the relief valve itself.

Changes may be made in the form, construction and arrangement of parts from those disclosed herein without in any way departing from the spirit of the invention or sacrificing any of the attendant advantages thereof, provided, however, that such changes fall within the scope of the claims appended hereto.

The invention is hereby claimed as follows:

1. A relief valve for maintaining fluid under pressure between selected limits, comprising a valve casing having a chamber, an inlet and an outlet, a main valve in said chamber for providing a relief outlet for said chamber, said main valve including a bore and an annular portion slidably received therein, diametrically reduced portions extending from each end of said annular portion, one of said reduced portions extending into said chamber, and the other defining a second chamber with the wall of said bore, a passage through said annular portion intercommunicating said chambers, said annular portion being normally substantially balanced under fluid pressure when the main valve is closed whereby the fluid pressure tends to neither close nor open the valve and being unbalanced for opening the valve when fluid pressure is relieved in said second chamber, spring means acting on said annular portion to normally maintain the valve closed, an auxiliary valve including a slidable valve member coacting with a valve seat, a passage from said second chamber to one side of said auxiliary valve thereby communicating it with the pressurized fluid in said second chamber and the other side communicating with a low pressure outlet, and pneumatic means normally pressure biasing said auxiliary valve seat, the pressure in said pneumatic means being capable of being adjusted from a remote control point, whereby the auxiliary valve is opened thereby venting the fluid from the second chamber to said low pressure outlet to permit opening of the main valve against the action of said spring means when pressure of the fluid against said one side of said auxiliary valve exceeds the pneumatic pressure.

2. A relief valve as defined in claim 1 combined with switch means, and means operatively associated with said auxiliary valve to actuate said switch means when said auxiliary valve is moved to open and closed positions.

References Cited in the file of this patent

UNITED STATES PATENTS

| | | |
|---|---|---|
| 231,214 | Curtis | Aug. 17, 1880 |
| 417,329 | Marsh | Dec. 17, 1889 |
| 2,082,325 | Cross | June 1, 1937 |
| 2,261,364 | Grove | Nov. 11, 1941 |
| 2,339,087 | Mantz | Jan. 11, 1944 |
| 2,388,820 | Bonnell | Nov. 13, 1945 |
| 2,479,359 | Holt | Aug. 16, 1949 |
| 2,564,133 | Stadler | Aug. 14, 1951 |
| 2,639,103 | Ball | May 19, 1953 |
| 2,731,033 | Cable | Jan. 17, 1956 |
| 2,734,106 | Riley et al. | Feb. 7, 1956 |